UNITED STATES PATENT OFFICE.

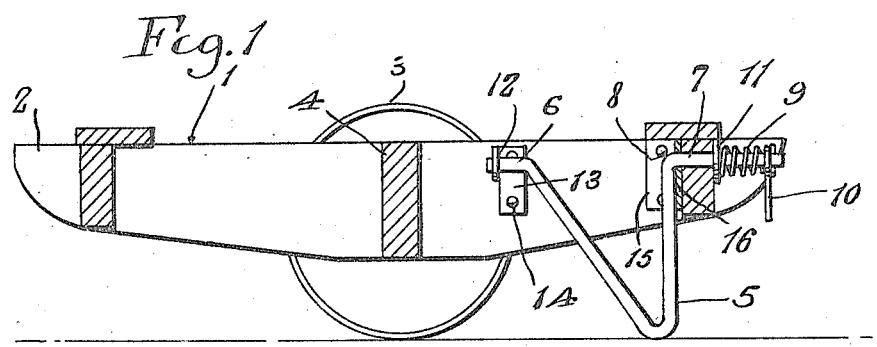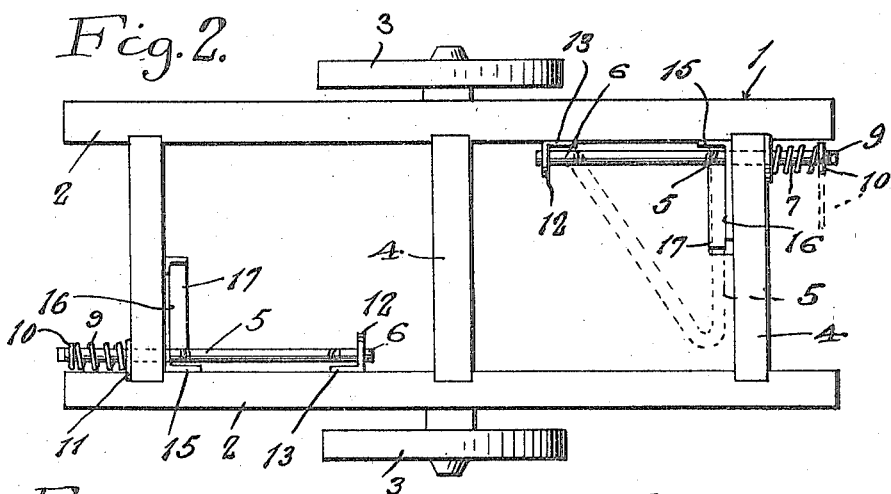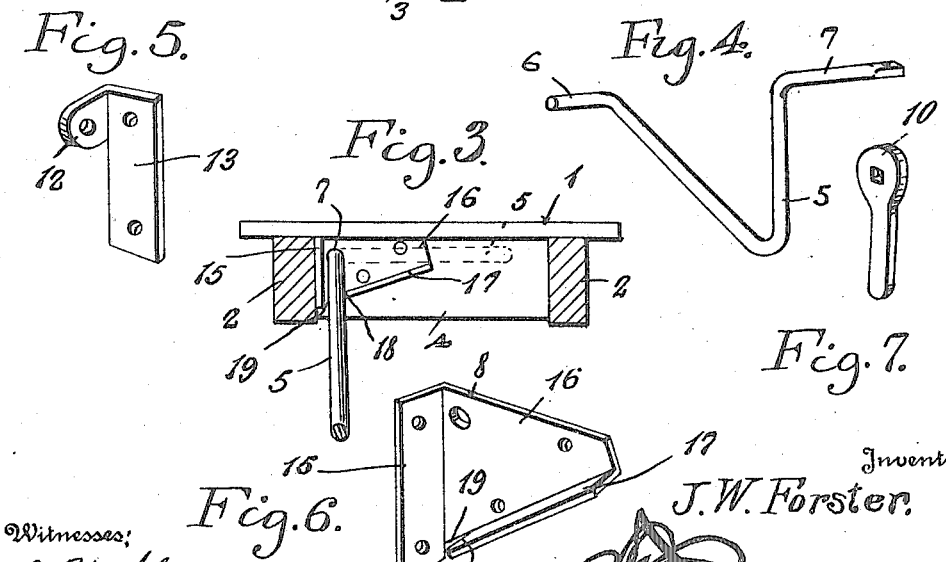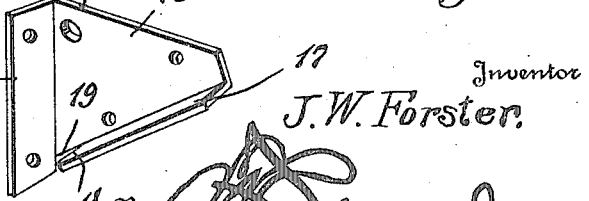

JESSE W. FORSTER, OF ALBANY, OREGON.

TRUCK ATTACHMENT.

1,264,048.      Specification of Letters Patent.      Patented Apr. 23, 1918.

Application filed April 27, 1917. Serial No. 164,933.

*To all whom it may concern:*

Be it known that I, JESSE W. FORSTER, a citizen of the United States, residing at Albany, in the county of Linn and State of Oregon, have invented certain new and useful Improvements in Truck Attachments; and I do hereby declare the following to be a full, clear, and exact description of the invention, such as will enable others skilled in the art to which it appertains to make and use the same.

This invention relates to a truck attachment and more particularly to a device adapted to be employed upon a lumber truck of the two wheel type and has for one of its objects the provision of means whereby each end of the truck may be supported so as to prevent the truck from tipping when being loaded.

Another object of this invention is the provision of substantially V-shaped members carried by each end of the truck and adapted to be swung downwardly for engagement with the ground to support each end of the truck to prevent the same from tipping while loading.

A further object of this invention is the provision of means capable of locking the V-shaped member against movement either in operative or inoperative position.

A still further object of this invention is the provision of a truck attachment of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a longitudinal sectional view of a truck attachment constructed in accordance with my invention, Fig. 2 is a top plan view of the same, Fig. 3 is a transverse sectional view illustrating the V-shaped supporting members in engagement with the ground, Fig. 4 is a perspective view of one of the V-shaped members, Fig. 5 is a perspective view of the brackets for supporting one end of the V-shaped member, Fig. 6 is a perspective view of the locking bracket for locking the V-shaped member in operative or inoperative position, Fig. 7 is a perspective view of an operating handle.

Referring in detail to the drawing, the numeral 1 indicates as an entirety, a lumber truck consisting of a pair of relatively spaced side members 2, which have journaled thereon, intermediate their ends, ground wheels 3. The side members 2 are connected by transverse members 4, for supporting lumber or the like upon the device. The afore description relates to a well known construction of truck and to which my invention is applied.

In applying my invention to the above described truck, one is applied to each end thereof as shown in Fig. 2, and reference to one is thought to be sufficient for both.

A substantially V-shaped supporting member 5 has the ends 6 and 7 of its arm portions angularly related thereto and the end 7 is of greater length than the end 6 and is inserted through an aperture in the locking bracket 8 carried by one of the side members 2 and one of the end transverse members 4. The end 7 after passing through the locking bracket 8 is extended through an aperture in the end transverse member 4 and has mounted thereon, a coiled spring 9. Secured to the free end of the end 7 is a handle 10. The coiled spring 9 exerts pressure upon the washer 11 and the handle 10 for normally urging the V-shaped supporting member 5 into engagement with the locking bracket 8.

The end 6 of the V-shaped supporting member 5 extends through an aperture in an ear 12 formed upon a bracket 13, which is secured to one of the side members 2 as shown at 14.

The locking bracket 8 is of substantially L-shaped formation and has its arm portions 15 secured to one of the side members as clearly shown in Figs. 1 and 2, while its portion 16 is secured to one of the end transverse members 4 and is of substantially triangular shape in outline. A flange 17 is formed upon the lower edge of the portion 16 of the bracket 8 and has a cut out portion 18 to form a receiving notch 19 for receiving one of the arm portions of the substantially V-shaped supporting member when moved into operative position or into engagement with the ground for supporting the truck as shown in Fig. 1, thus preventing the supporting member from accidental movement while in operative position.

By pushing inwardly upon the handle 10 against the tension of the spring 9, the V-shaped supporting member 5 is disengaged from the notch 18 and by rotating or turning the handle 10, the V-shaped member is swung into a substantially horizontal position as shown in Fig. 2 in dotted lines. When in this position the V-shaped member 5 engages over the upper end of the flange 18 and is locked against movement while in an inoperative position.

From the foregoing description taken in connection with the accompanying drawing, it is to be noted that a novel means has been provided for supporting each end of a truck of the two wheel type so that the same will not tip over when being loaded or unloaded. It will also be noted that the supporting means is capable of being locked either in an operative or inoperative position.

While I have shown and described the preferred embodiment of my invention, it will be understood that minor changes in construction, combination and arrangement of parts may be made without departing from the spirit and scope of the invention as claimed.

Having thus described my invention, what I claim is:

1. The combination with a truck including a frame and supporting wheels, of a substantially V-shaped supporting member having its ends angularly related, a bracket secured to the frame and receiving one end of the supporting member, a locking bracket secured to the frame and rotatably receiving the other end of the supporting member, and a flange formed upon one of the brackets for locking the supporting member in operative or inoperative position.

2. The combination with a truck including a frame and supporting wheels, of a substantially V-shaped supporting member having its ends angularly related, a bracket secured to the frame and rotatably receiving one end of the supporting member, a locking bracket secured to the frame and rotatably receiving the other end of the supporting member, a handle secured to the last named end of the supporting member, a coiled spring interposed upon the last named end between the frame and the handle, and a flange formed upon the locking bracket for locking the supporting member in operative or inoperative position.

In testimony whereof I affix my signature in presence of two witnesses.

JESSE W. FORSTER.

Witnesses:
J. V. PIPE,
J. M. PIPE.

Copies of this patent may be obtained for five cents each, by addressing the "Commissioner of Patents, Washington, D. C."